(12) United States Patent
Ni et al.

(10) Patent No.: US 11,822,424 B2
(45) Date of Patent: Nov. 21, 2023

(54) SERVICE REQUEST REMEDIATION WITH MACHINE LEARNING BASED IDENTIFICATION OF CRITICAL AREAS OF LOG SEGMENTS

(71) Applicant: Dell Products L.P., Round Rock, TX (US)

(72) Inventors: Jiacheng Ni, Shanghai (CN); Min Gong, Shanghai (CN); Guangzhou Zhou, Shanghai (CN); Zijia Wang, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 297 days.

(21) Appl. No.: 17/236,107

(22) Filed: Apr. 21, 2021

(65) Prior Publication Data
US 2022/0308952 A1    Sep. 29, 2022

(30) Foreign Application Priority Data
Mar. 29, 2021   (CN) .......................... 202110335351.8

(51) Int. Cl.
*G06F 11/07* (2006.01)
*G06N 20/00* (2019.01)
(Continued)

(52) U.S. Cl.
CPC ...... *G06F 11/0793* (2013.01); *G06F 11/0775* (2013.01); *G06F 11/0787* (2013.01);
(Continued)

(58) Field of Classification Search
CPC ............ G06F 11/0793; G06F 11/0775; G06F 11/0787; G06F 18/214; G06F 18/22;
(Continued)

(56) References Cited

U.S. PATENT DOCUMENTS 11,501,013 B1 * 11/2022 Das ..................... G06F 21/6218
11,610,076 B2 * 3/2023 Iskandar ............. G06F 11/3495
(Continued)

OTHER PUBLICATIONS

Wikipedia, "Hamming Distance," https://en.wikipedia.org/wiki/Hamming_distance, Apr. 3, 2020, 6 pages.
(Continued)

*Primary Examiner* — Matthew M Kim
*Assistant Examiner* — Matthew N Putaraksa
(74) *Attorney, Agent, or Firm* — Ryan, Mason & Lewis, LLP

(57) ABSTRACT

An apparatus comprises a processing device configured to receive a service request associated with a given asset, to obtain a log file associated with the given asset, to split the log file into log segments, to generate sets of log pattern identifiers for the log segments, and to determine risk scores for the log segments utilizing a machine learning model that takes as input the sets of log pattern identifiers and provides as output information characterizing risk of the log segments. The processing device is also configured to identify critical areas of the log file based at least in part on the determined risk scores, a given critical area comprising a sequence of log segments having determined risk scores above a designated risk score threshold. The processing device is further configured to analyze the identified critical areas to determine remedial actions to be applied for resolving the service request.

20 Claims, 19 Drawing Sheets

(51) Int. Cl.
*G06F 40/30* (2020.01)
*G06N 5/022* (2023.01)
*G06F 18/22* (2023.01)
*G06F 18/214* (2023.01)

(52) U.S. Cl.
CPC ............ *G06F 18/214* (2023.01); *G06F 18/22* (2023.01); *G06F 40/30* (2020.01); *G06N 5/022* (2013.01); *G06N 20/00* (2019.01)

(58) Field of Classification Search
CPC .... G06F 40/30; G06F 40/205; G06F 16/1815; G06N 5/022; G06N 20/00; G06N 3/045; G06N 3/09; G06N 3/096; G06Q 10/0635; G06Q 10/06393
See application file for complete search history.

(56) References Cited

U.S. PATENT DOCUMENTS

| | | | | |
|---|---|---|---|---|
| 2020/0249651 | A1* | 8/2020 | Lee | G06N 3/08 |
| 2021/0174253 | A1* | 6/2021 | Moore | G06N 7/01 |
| 2021/0279644 | A1* | 9/2021 | Givental | G06F 18/2321 |
| 2021/0281592 | A1* | 9/2021 | Givental | G06N 20/10 |
| 2021/0397500 | A1* | 12/2021 | Wieder | G06F 11/079 |
| 2021/0406114 | A1* | 12/2021 | Chen | H04L 41/0654 |
| 2022/0092062 | A1* | 3/2022 | Ferrar | G06F 11/3072 |
| 2022/0138556 | A1* | 5/2022 | Richardson | G06F 16/258 706/25 |
| 2022/0164245 | A1* | 5/2022 | Lepird | G06F 11/079 |
| 2022/0277176 | A1* | 9/2022 | Bhatia | G06N 3/045 |

OTHER PUBLICATIONS

Wikipedia, "Bag-of-Words Model," https://en.wikipedia.org/wiki/Bag-of-words_model, Mar. 31, 2020, 5 pages.
Wikipedia, "Levenshtein Distance," https://en.wikipedia.org/wiki/Levenshtein_distance, Apr. 7, 2020, 8 pages.
Wikipedia, "tf-idf," https://en.wikipedia.org/wiki/Tf-idf, Mar. 29, 2020, 7 pages.
Wikipedia, "Stack Trace," https://en.wikipedia.org/wiki/Stack_trace, Mar. 10, 2020, 2 pages.
Tensor Flow Core, "Embedding Projector," https://projector.tensorflow.org/, 2020, 1 pages.
J. Devlin et al., "BERT: Pre-training of Deep Bidirectional Transformers for Language Understanding," arXiv:1810.04805v2, May 24, 2019, 16 pages.
A. Vaswani et al., "Attention Is All You Need," arXiv:1706.03762v5, Dec. 6, 2017, 15 pages.
Y. Liu et al., "RoBERTa: A Robustly Optimized BERT Pretraining Approach," arXiv:1907.11692v1, Jul. 26, 2019, 13 pages.
NVM Express, "NVM Express, Revision 1.3," NVM Express, May 1, 2017, 282 pages.
U.S. Appl. No. 17/002,333 filed in the name of Min Gong et al., filed Aug. 25, 2020, and entitled "Method, Electronic Device, and Computer Program Product for Analyzing Log File."

* cited by examiner

| LOG PATTERN ID | LOG PATTERN |
|---|---|
| ABCD1234 | TEXT 1 |
| EFGH5678 | TEXT 2 |
| IJKL9012 | TEXT 3 |
| EFGH5678 | TEXT 2 |
| IJKL9012 | TEXT 3 |
| MNOP3456 | TEXT 4 |
| IJKL9012 | TEXT 3 |
| IJKL9012 | TEXT 3 |
| IJKL9012 | TEXT 3 |
| ... | ... |
| IJKL9012 | TEXT 3 |

903

RUN SIMILARITY PROCESSING ⇧

| RAW LOG LINES |
|---|
| LOG MESSAGE TEXT 1 |
| LOG MESSAGE TEXT 2 |
| LOG MESSAGE TEXT 3 |
| LOG MESSAGE TEXT 4 |
| LOG MESSAGE TEXT 5 |
| LOG MESSAGE TEXT 6 |
| LOG MESSAGE TEXT 7 |
| LOG MESSAGE TEXT 8 |
| LOG MESSAGE TEXT 9 |
| ... |
| LOG MESSAGE TEXT 512 |

901

SERVICE REQUEST REMEDIATION WITH MACHINE LEARNING BASED IDENTIFICATION OF CRITICAL AREAS OF LOG SEGMENTS

RELATED APPLICATION

The present application claims priority to Chinese Patent Application No. 202110335351.8, filed on Mar. 29, 2021 and entitled "Service Request Remediation with Machine Learning Based Identification of Critical Areas of Log Files," which is incorporated by reference herein in its entirety.

BACKGROUND

Monitoring and analytics platforms may be utilized to provide various services for assets of information technology infrastructure. Such services may include, for example, troubleshooting and remediation of issues encountered on such assets. This may include support engineers of the monitoring and analytics platform receiving service requests from end-users associated with the assets, and the support engineers determining root causes of the issues encountered on the assets. To do so, the support engineers may review log files that are generated by or otherwise associated with the assets.

SUMMARY

Illustrative embodiments of the present disclosure provide techniques for service request remediation with machine learning based identification of critical areas of log files.

In one embodiment, an apparatus comprises at least one processing device comprising a processor coupled to a memory. The at least one processing device is configured to perform the steps of receiving a service request associated with a given asset of an information technology infrastructure, obtaining at least one log file associated with the given asset, splitting the at least one log file into a plurality of log segments, generating a set of log pattern identifiers for each of the plurality of log segments, and determining risk scores for each of the plurality of log segments utilizing a machine learning model, the machine learning model taking as input the sets of log pattern identifiers and providing as output information characterizing risk of respective ones of the plurality of log segments. The at least one processing device is also configured to perform the step of identifying one or more critical areas of the at least one log file based at least in part on the determined risk scores, a given one of the one or more critical areas comprising a sequence of two or more of the plurality of log segments of the at least one log file having determined risk scores above a designated risk score threshold. The at least one processing device is further configured to perform the step of analyzing the identified one or more critical areas to determine one or more remedial actions to be applied to the given asset for resolving the service request.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
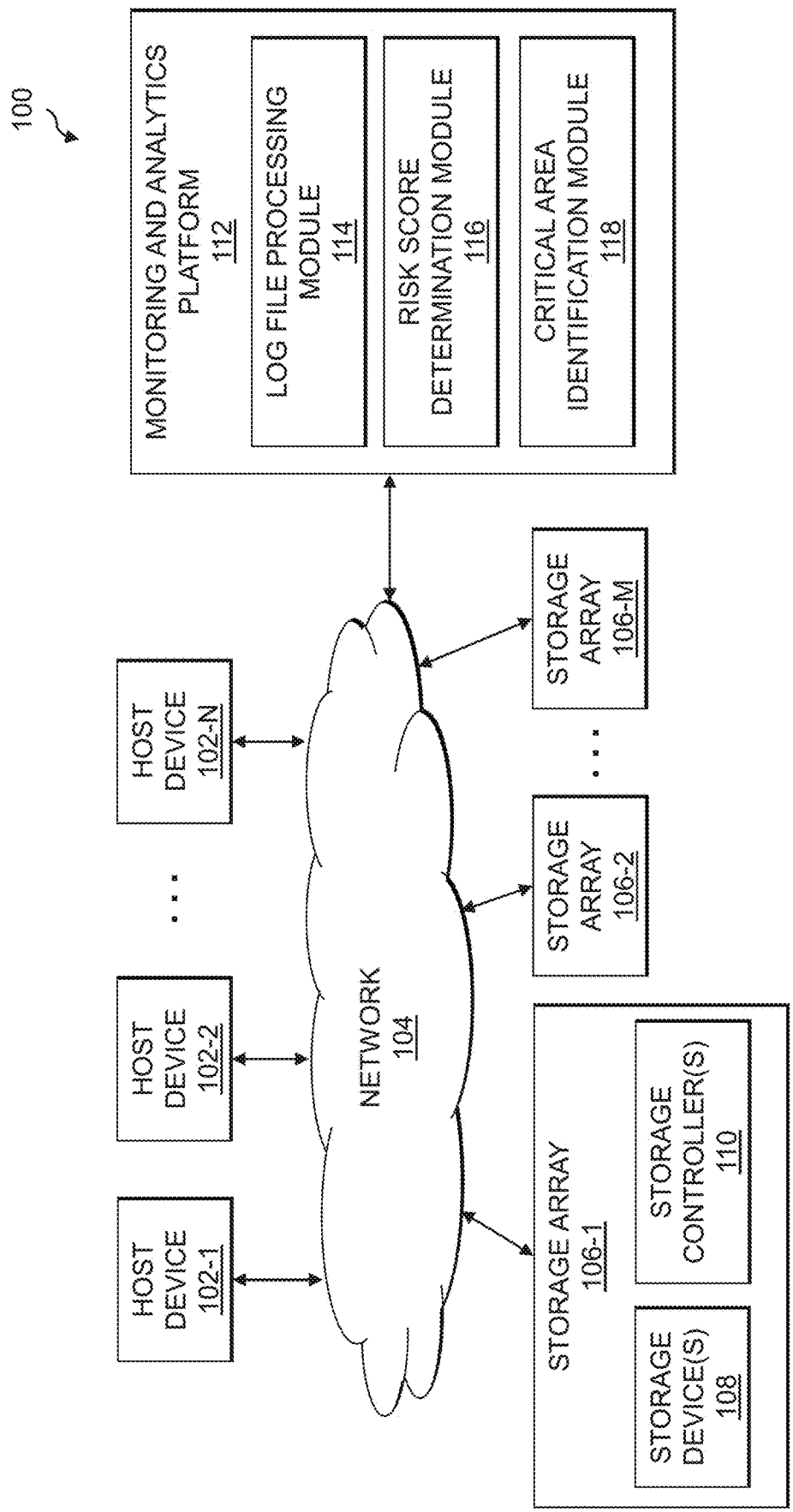
FIG. 1 is a block diagram of an information processing system configured for service request remediation with machine learning based identification of critical areas of log files in an illustrative embodiment.

FIG. 1 shows an information processing system 100 configured in accordance with an illustrative embodiment to provide functionality for service request remediation with machine learning based identification of critical areas of log files. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The information processing system 100 further includes a monitoring and analytics platform 112 that is configured to provide functionality for service request remediation. For example, the monitoring and analytics platform 112 may be offered as a service that is utilized by users of the host devices 102 for triaging service requests associated with the storage arrays 106 (or, more generally, assets of an information technology (IT) infrastructure where such assets may include physical and virtual computing resources). In some embodiments, such users may include support engineers which leverage artificial intelligence capabilities of the monitoring and analytics platform 112 to automate the analysis of log files associated with the storage arrays 106. The log files may be obtained directly from the storage arrays 106 (e.g., the log files may be produced and stored on the storage arrays 106), from host devices 102 utilizing the storage arrays 106, from monitoring tools (e.g., which may be implemented as part of the monitoring and analytics platform 112 itself) that monitor operation of the storage arrays 106, etc. Such artificial intelligence capabilities may include, for example, identification of "critical" areas of logfiles that are likely to include information on the root cause of issues encountered on the storage arrays 106. A critical area may include a sequence of log segments of a log file that have some designated threshold risk scores as determined using machine learning models implemented by the monitoring and analytics platform 112.

The monitoring and analytics platform 112 includes a log file processing module 114, a risk score determination module 116 and a critical area identification module 118. The monitoring and analytics platform 112 is configured to receive service requests (e.g., from users of the host devices 102) for resolving issues encountered on assets, where the assets in the FIG. 1 embodiment are assumed to be the storage arrays 106. As noted above and elsewhere herein, however, such assets may more generally include physical and/or virtual computing resources of an IT infrastructure. For a given service request directed to a given one of the storage arrays (e.g., storage array 106-1), the log file processing module 114 is configured to obtain one or more log files that are associated with the given storage array 106-1, to split the log files into a plurality of log segments, and to generate sets of log pattern identifiers for the log segments. In some embodiments, each log segment includes a designated number (e.g., 512) of log lines in a log file and each of the log pattern identifiers may represent one of the log lines. The risk score determination module 116 is configured to determine risk scores for each of the log segments utilizing a machine learning model, where the machine learning model takes as input the sets of log pattern identifiers and provides as output information characterizing risk of respective ones of the plurality of log segments. The critical area identification module 118 is configured to identify one or more critical areas of the log files based at least in part on the determined risk scores. For example, a given one of the one or more critical areas may comprise a sequence of two or more of log segments of a log file that have determined risk scores above a designated risk score threshold. The monitoring and analytics platform 112 is configured to analyze the identified one or more critical areas to determine one or more remedial actions to be applied for resolving the service requests.

At least portions of the functionality of the log file processing module 114, the risk score determination module 116, and the critical area identification module 118 may be implemented at least in part in the form of software that is stored in memory and executed by a processor.

Although shown as external to the host devices 102 and storage arrays 106 in the FIG. 1 embodiment, it should be appreciated that the monitoring and analytics platform 112 in other embodiments may be implemented at least in part internal to one or more of the host devices 102 and/or one or more of the storage arrays 106 (e.g., such as on the storage controllers 110 of storage array 106-1).

The host devices 102, storage arrays 106 and monitoring and analytics platform 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage arrays 106 and the monitoring and analytics platform 112 may be implemented on respective distinct processing platforms, although numerous other arrangements are possible. For example, in some embodiments at least portions of one or more of the host devices 102, the storage arrays 106 and the monitoring and analytics platform 112 are implemented on the same processing platform. The monitoring and analytics platform 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 and other portions of the system 100, such as the monitoring and analytics platform 112, may in some embodiments be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the monitoring and analytics platform 112 may be implemented at least in part in the first geographic location, the second geographic location, and one or more other geographic locations. Thus, it is possible in some implementations of the system 100 for different ones of the host devices 102, the storage arrays 106 and the monitoring and analytics platform 112 to reside in different data centers.

Numerous other distributed implementations of the host devices 102, the storage array 106 and the monitoring and analytics platform 112 are possible. Accordingly, the host devices 102, the storage array 106 and the monitoring and analytics platform 112 can also be implemented in a distributed manner across multiple data centers.

Additional examples of processing platforms utilized to implement portions of the system 100 in illustrative embodiments will be described in more detail below in conjunction with FIGS. 16 and 17.

It is to be understood that the particular set of elements shown in FIG. 1 for service request remediation with machine learning based identification of critical areas of log files is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for service request remediation with machine learning based identification of critical areas of log files will now be described in more detail with reference to the flow diagram of FIG. 2. It is to be understood that this particular process is only an example, and that additional or alternative processes for service request remediation with machine learning based identification of critical areas of log files may be used in other embodiments.

In this embodiment, the process includes steps 200 through 212. These steps are assumed to be performed by the monitoring and analytics platform 112 utilizing the log file processing module 114, the risk score determination module 116, and the critical area identification module 118. The process begins with step 200, receiving a service request associated with a given asset of an information technology (IT) infrastructure. The given asset may comprise a physical computing resource (e.g., a server, storage array, network equipment, etc.), a virtual computing resource (e.g., a virtual machine (VM), a software container, etc.), or combinations thereof. For example, the given asset may comprise one of the storage arrays 106 or host devices 102 in the system 100.

In step 202, at least one log file associated with the given asset is obtained. The log file may be obtained directly from the given asset, from one or more monitoring tools that monitor the given asset, combinations thereof, etc. The at least one log file is split into a plurality of log segments in step 204. In some embodiments, the log segments are equal-sized (e.g., some designated number of log lines, such as 512 log lines per log segment). A set of log pattern identifiers is generated in step 206 for each of the plurality of log segments. Step 206 may include splitting the at least one log file into log segments each comprising a designated number of log lines of the at least one log file, and each of the log pattern identifiers may represent one of the log lines. Generating the set of log pattern identifiers may comprise clustering the log lines to formulate a set of log patterns, and assigning each of the log lines an identifier associated with one of the set of log patterns. Clustering the log lines to formulate the set of log patterns may comprise measuring similarity between the log lines utilizing one or more similarity measures.

In step 208, risk scores for each of the plurality of log segments are determined utilizing a machine learning model. The machine learning model takes as input the sets of log pattern identifiers and provides as output information characterizing risk of respective ones of the plurality of log segments. Step 208 may be based at least in part on analyzing an entropy of the output information characterizing the risk of respective ones of the plurality of log segments. The machine learning model may comprise a Bidirectional Encoder Representations from Transformers (BERT) model. The BERT model may be pre-trained utilizing a Masked Language Model (MLM) and Next Sentence Prediction (NSP). The BERT model may be configured, for a given one of the plurality of log segments, to embed the set of log pattern identifiers for the given log segment into a set of input vectors, to process the set of input vectors in a set of two or more stacked encoders, to output a sequence of output vectors each corresponding to one of the set of log pattern identifiers for the given log segment.

One or more critical areas of the at least one log file are identified in step 210 based at least in part on the determined risk scores. A given one of the one or more critical areas comprises a sequence of two or more of the plurality of log segments of the at least one log file having determined risk scores above a designated risk score threshold. Step 210 may include applying a sliding window filter to risk scores associated with a continuous sequence of the plurality of log segments of the at least one log file. Applying the sliding window filter may comprise setting a window size comprising at least two log segments, setting one or more threshold matching criteria, identifying a beginning of the given critical area of the at least one log file when the at least two log segments in a window of the sliding window filter meet the one or more threshold matching criteria, and identifying an end of the given critical area of the at least one log file when the at least two log segments in the window of the sliding window filter do not meet the one or more threshold matching criteria. The sliding window filter may comprise a sliding window average filter, and the one or more threshold matching criteria may comprise a designated average risk score of the at least two segments in the window of the sliding window average filter.

Figure 2:
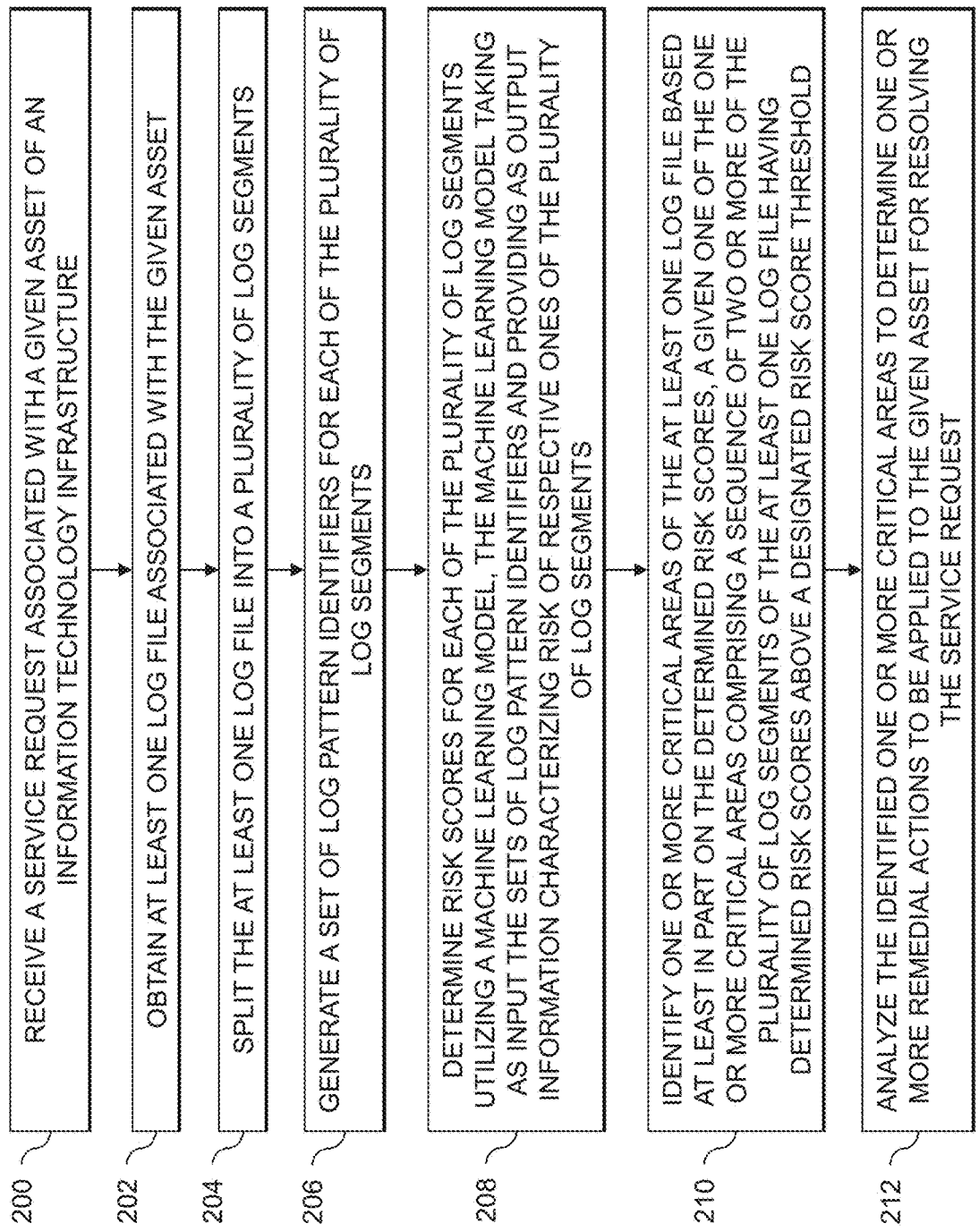
FIG. 2 is a flow diagram of an exemplary process for service request remediation with machine learning based identification of critical areas of log files in an illustrative embodiment.

The FIG. 2 process continues with step 212, analyzing the identified one or more critical areas to determine one or more remedial actions to be applied to the given asset for resolving the service request. Step 212 may include identifying one or more issues from a knowledge base of issues that have at least a designated threshold likelihood of affecting the given asset in the information technology infrastructure, and determining the one or more remedial actions to be applied to the given asset for resolving the service request based at least in part on the identified one or more issues from the knowledge base of issues.

Conventional approaches to handling and triaging service requests are highly manual processes. There is thus a need for solutions that can at least partially automate the processes of handling and triaging service requests. Illustrative embodiments provide techniques that utilize artificial intelligence to assist in recommending solutions for handling and triaging service requests. While various embodiments are described with respect to handling and triaging storage system service requests, it should be appreciated that embodiments are not limited solely to storage system service requests. In other embodiments, various other types of service requests may be handled and triaged using the techniques described herein.

As noted above, illustrative embodiments apply artificial intelligence to the problem of triaging service requests using a natural language processing (NLP) framework that recommends actions or solutions based on log data. In some embodiments, a transformer-based machine learning framework, such as a Bidirectional Encoder Representations from Transformers (BERT) NLP framework, is used to build a model that parses logs (e.g., storage system logs) to identify high-probability blocks of text that are symptomatic of issues encountered (e.g., on storage systems). The model is further configured to recommend knowledge base artifacts (e.g., known solutions) according to their associated probability of being the proper solution. Advantageously, the NLP framework may be run as a background task in a service engineer's tool or otherwise as part of a monitoring and analytics platform. The monitoring and analytics platform may be cloud-based, such as a Dell EMC CloudIQ platform, which is suitably modified to incorporate the functionality described herein.

Monitoring and analytics platforms, as noted above, may be cloud-based. For example, CloudIQ provides proactive monitoring and analytics functionality for storage systems. CloudIQ advantageously provides a Software-as-a-Service (SaaS) solution, enabling delivery of frequent, dynamic and non-disruptive content updates for end-users. Further, CloudIQ is built in a secure multi-tenant platform to ensure that each customer or other end-user tenant is properly isolated and secure from other end-users. Once storage systems establish a connection to CloudIQ, regular data (e.g., alerts, performance information, etc.) updates may be collected. Such collected data may be used to drive value, such as in leveraging advanced analytics powered by machine learning to deliver higher uptime, increase performance, perform effective capacity planning, triaging service requests, etc.

For a large and complex environment, such as a large and complex storage environment, technical support engineers may be required to process a large amount of end-user service requests. Such end-user service requests may relate to issues encountered during use of the storage environment (e.g., where the issues may be caused by software, hardware or network issues). Such issues may include defects or failure of the software, hardware or network resources, operation errors, etc. If a support engineer is not able to determine the cause of a failure from a problem description, the support engineer may request that the end-user upload recent system log files for further triage. It should be noted that, in some cases, such log files may be uploaded or obtained by a monitoring and analytics platform automatically (e.g., without requiring end-user action). Detecting the cause of system failures or other issues from such log files, however, is a difficult task. Each log file may include a set of continuous log lines within some designated time interval. There is thus a need for inferring root causes of issues from system logs automatically, as this can speed up service request triaging processes.

Figure 3:
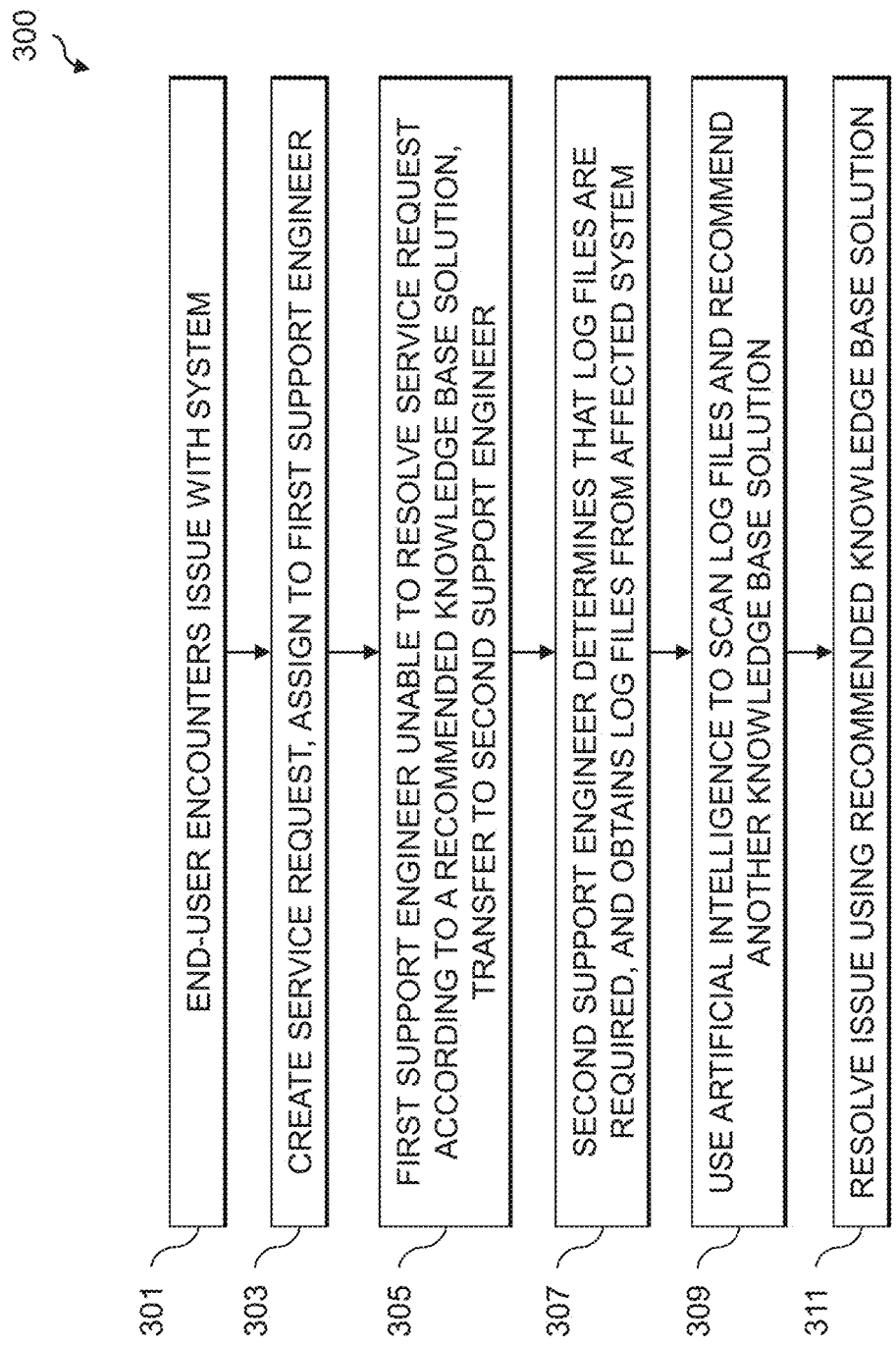
FIG. 3 is a flow diagram of an exemplary process for triaging service requests in an illustrative embodiment.

FIG. 3 illustrates an example support service process flow 300. The process flow 300 begins in step 301 with an end-user encountering an issue with a system (e.g., a storage system). For example, the end-user may be a customer that is unable to access a particular storage cluster (e.g., the cluster has failure when the client links to it using a Server Message Block (SMB) protocol). In step 303, a service request (SR) is created, and the SR is assigned to a first support engineer (e.g., a Level 1 or L1 support engineer). The SR may be translated from a customer email or message reporting the issue encountered in step 301. In step 305, it is assumed that the first support engineer is unable to resolve the SR according to a recommended knowledge base (KB) solution, and thus the SR is transferred to a second support engineer (e.g., a Level 2 or L2 support engineer). The second support engineer determines in step 307 that log files are required to triage the SR, and obtains the log files from the affected system. In step 309, artificial intelligence (AI) is used to scan the log files to recommend one or more other KB solutions for resolving the issue encountered by the end-user in step 301. One or more of the AI-recommended KB solutions are then used in step 311 to resolve the issue encountered by the end-user in step 301. Although in the process flow 300 it is the second support engineer that utilizes AI to scan the log files to determine a solution for resolving the issue, it should be appreciated that in other embodiments the first engineer may do so. Further, the AI log scanning may be performed as a first step in attempting to resolve a SR, rather than after the first support engineer tries to triage the SR using other methods (e.g., manual analysis, though text analysis of the SR itself rather than system logs obtained from the affected system, etc.).

As noted above, illustrative embodiments provide techniques for using AI to build a machine learning model (e.g., an NLP model) that facilitates the process of triaging service requests by detecting critical areas (e.g., one or more log segments of log files) that are likely to indicate system failures from log files that are obtained from or otherwise associated with the systems. Such detected critical areas may be used to infer root causes for system failures. It should be noted that the "critical areas" may not always contain or indicate the reason for system failure or other issues encountered on the system due to various confounding factors (e.g., correlation does not imply causation). The critical areas, however, are associated with risk scores enabling a support engineer to inspect high risk log segments to make a final decision regarding the reason for system failure or other issues encountered on the system. As the machine learning model can analyze the log files automatically, the efficiency of a support or monitoring and analytics platform (or technical support engineers thereof) may be significantly improved.

In some embodiments, it is assumed that in log files that are associated with a system encountering an issue (also referred to as an affected system), several log segments may indicate the cause or causes of the system failure. A state-of-the-art language model, BERT, may be used to build an automatic log segment triage model. The log segment triage model is also referred to as a BERT-driven Log Triage Model (BLTM), and provides the log segment triage solution used in some embodiments. In BLTM, each log line is represented as a log "DNA" identifier (e.g., a log pattern ID) by clustering the log lines. A log pattern ID (e.g., representing a log line) is processed as a "word" and a log segment (e.g., a sequence of continuous log pattern IDs corresponding to continuous log lines) is processed as a "paragraph." In some implementations, the maximum input for a BERT model is 512, and thus if a word-level model is built than a window covering only about 20 log lines may be used which may be too small to provide useful results. Thus, log lines are translated to log pattern IDs, with the log pattern IDs being processed as words and a log segment (e.g., a continuous sequence of log pattern IDs, such as 512 log pattern IDs) is processed as a sentence or paragraph. The BERT model is pre-trained on the complete log segments, and fine-tuning may be performed using critical log segments labeled by support engineers.

A log segment representation model is built by BERT that learns a feature representation from log pattern ID sequences (e.g., each log line in an obtained log file may be translated to a log pattern ID) in a pre-training manner by a Masked Language Model (MLM). The BERT-based log segment representation is used as a feature representation for training a multi-class text classifier from labeled log segments (e.g., with each log segment labeled by an issue as its class) in a fine-tuning manner.

Experimentally, the usability of BLTM is evaluated by a Top N accuracy analysis. The entropy of the BLTM's softmax output is used to score the risk of input log segments. In application, the log file is split into continuous log segments with the BLTM being used to scan the log file to score each log segment with a risk level. A sliding window average filter is then used to detect the critical areas (e.g., consisting of several continuous log segments) from the complete log file or files. BLTM then recommends the issue for each critical log segment in the critical log areas. This machine learning model procedure and evaluation are discussed in further detail below with respect to a real-world dataset including collected and cleaned log files of a storage array.

Figure 4:
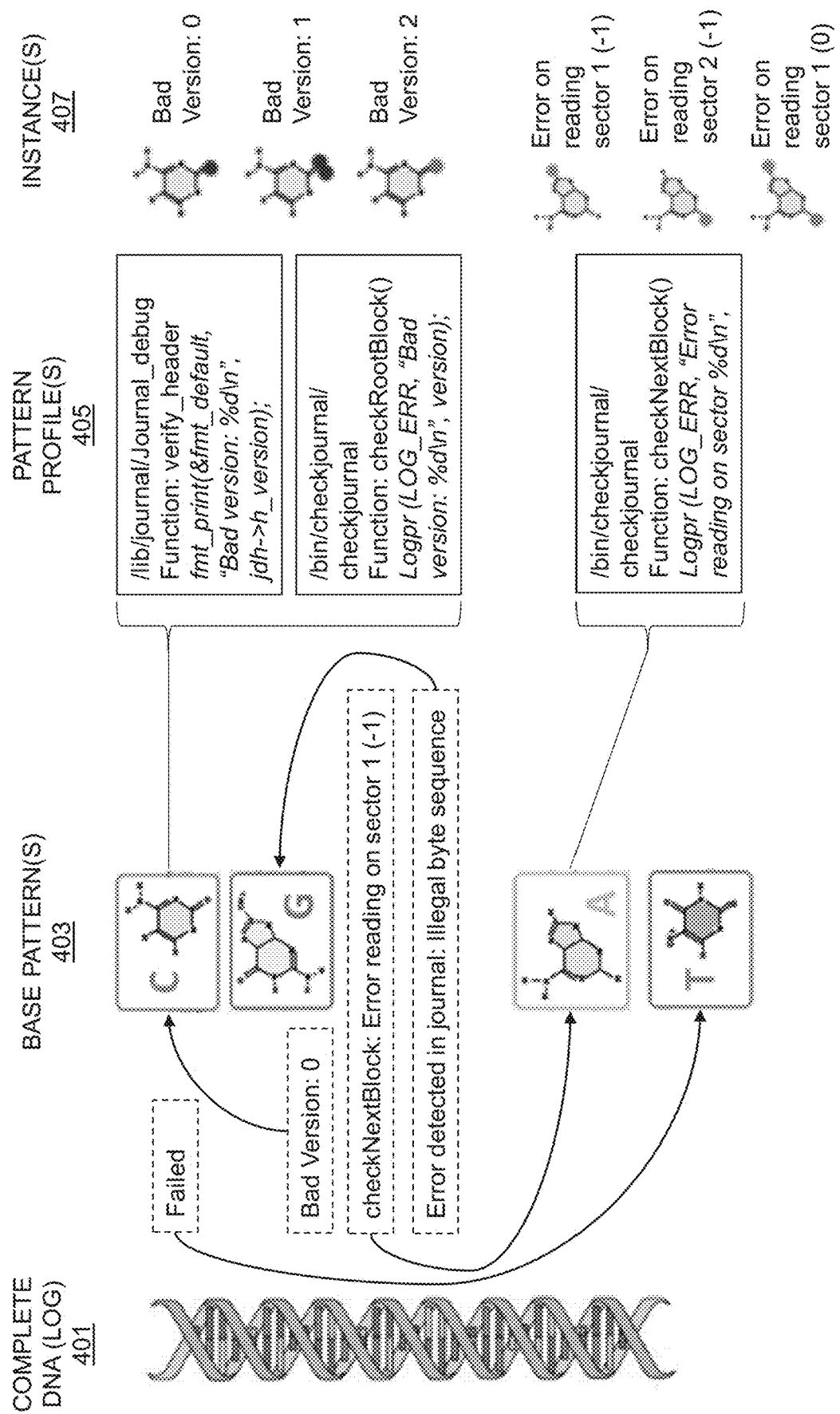
FIG. 4 illustrates generation of log pattern identifiers in an illustrative embodiment.

With a large and complex system, a large amount of logs (and log lines) will be generated. It is thus not possible or practical to build a word-level model for log segment triage. Thus, some embodiments use an approach referred to as log pattern identification to give a log line level analysis. In a log pattern identification approach, log lines are clustered to formulate log patterns, and each log line can be identified as a log pattern ID. A log segment can thus be transformed to a sequence of log pattern IDs. The sequence of log pattern IDs may then be fed into the model as the feature representation of the log segment to build the text classifier to triage the log segment. FIG. 4 illustrates an example of log pattern identification processing, illustrating a complete "DNA" 401 (e.g., an entire log file) as well as snippets of the complete DNA 401 that are mapped to base patterns 403. In the FIG. 4 example, four log line text snippets are shown in order of appearance in the log lines of the complete DNA or log file 401: "Failed"; "Bad Version: 0"; "checkNextBlock: Error reading on sector 1 (−1)"; and "Error detected in journal: Illegal byte sequence." These text snippets are mapped to base patterns T, C, A and G, respectively, as illustrated in FIG. 4. FIG. 4 also shows pattern profiles 405 for base patterns C and A, as well as different instances 407 of the base patterns C and A.

Figure 5:
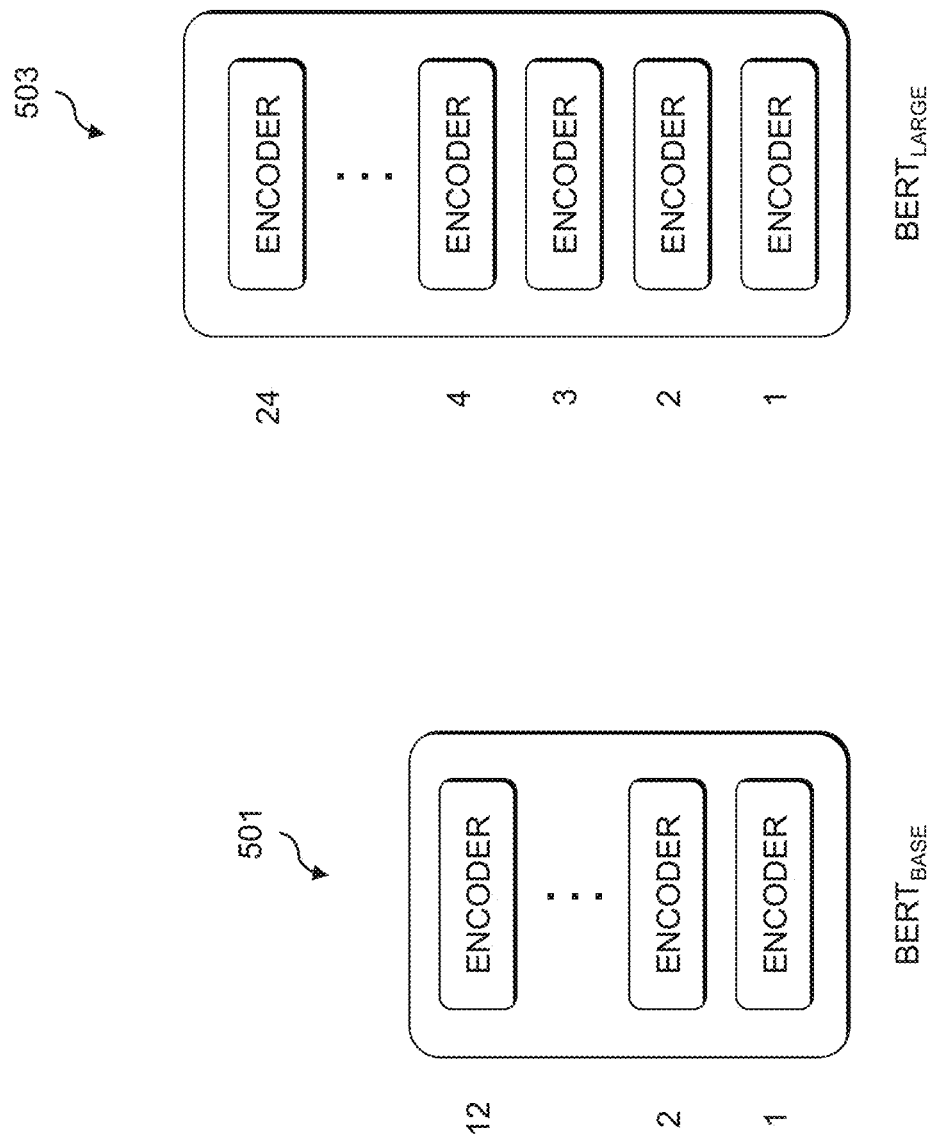
FIG. 5 illustrates example architectures of Bidirectional Encoder Representations from Transformers (BERT) machine learning models in an illustrative embodiment.
Figure 6:
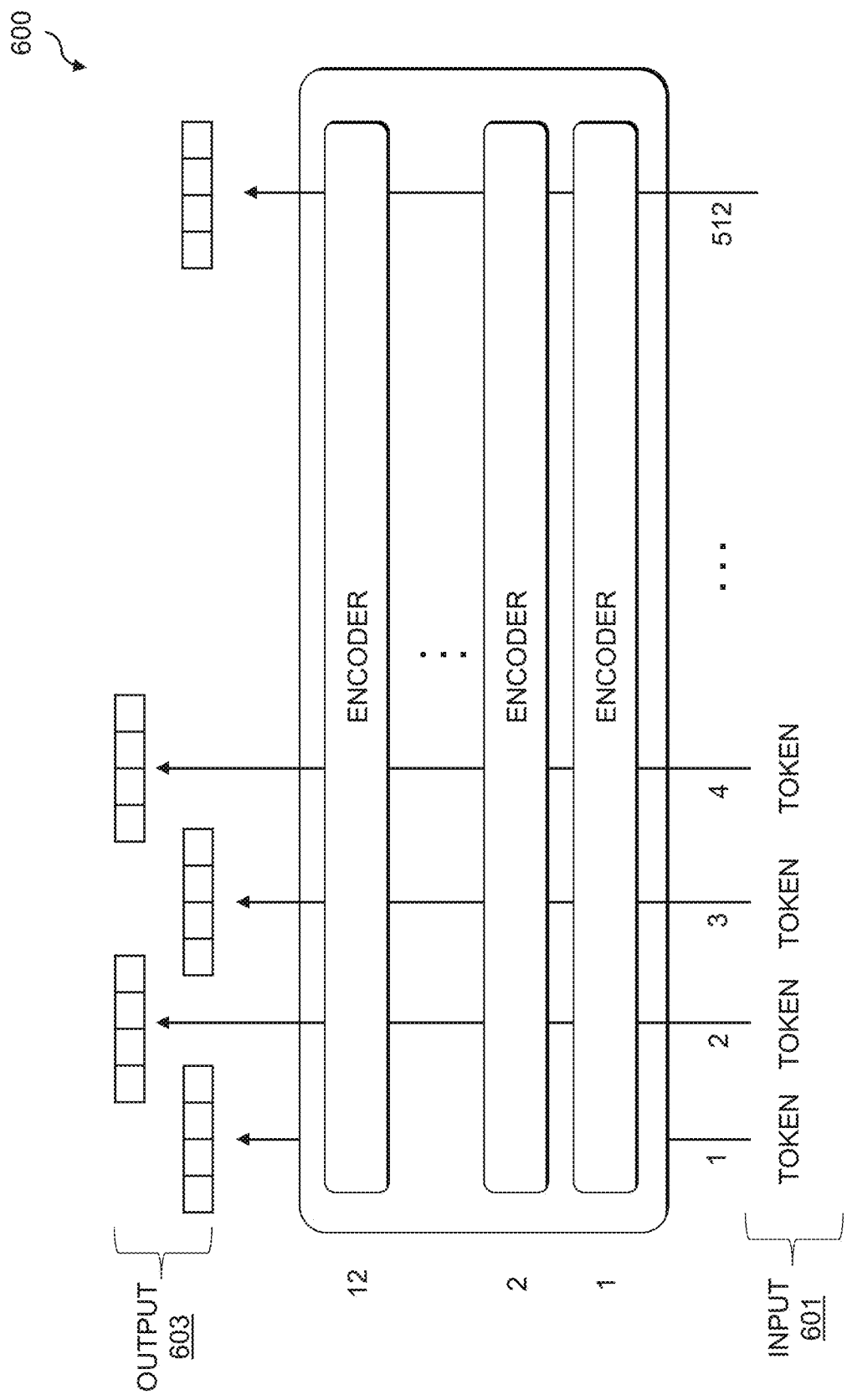
FIG. 6 illustrates operation of a BERT machine learning model in an illustrative embodiment.

The BERT model may be used in a wide variety of NLP tasks, including text classification. Advantageously, BERT applies bidirectional training of a Transformer attention model, enabling language modeling and fine-tuning of a language model to specific tasks. BERT makes use of an encoder of a Transformer, an attention mechanism that learns contextual relations between words in a text. A BERT model may include several stacked encoders, as illustrated in FIG. 5. FIG. 5 shows two BERT models—a "base" BERT model 501 with 12 stacked encoders, and a "large" BERT model 503 with 24 stacked encoders. The number of stacked encoders determines the number of parameters for the BERT model. The Transformer encoder reads an entire sequence of tokens, so the BERT model is considered bidirectional. This characteristic enables the BERT model to learn the context of a given word based on all of its surrounding (i.e., words to the left and right of the given word). Although FIG. 5 shows two examples of BERT models 501 and 503 with 12 and 24 stacked encoders, respectively, it should be appreciated that embodiments may utilize BERT models with other numbers of stacked encoders. FIG. 6 shows a BERT model 600, illustrating the input 601 as a sequence of tokens. The tokens are embedded into vectors, and then processed in the stacked encoders. The output 603 is a sequence of vectors of size H, in which each vector corresponds to an input token with the same index. Each input text starts with "[CLS]" and sentences are separated by "[SEP]."

In application, BERT may be used to build a text classifier model. At first, the BERT model is pre-trained with a related, large-scale corpus in a semi-supervised manner. Labeled instances are fed into the BERT model for fine-tuning. In the pre-training phase, a MLM and Next Sentence Prediction (NSP) are trained together with the goal of minimizing the combined loss function of the two strategies.

Figure 7:
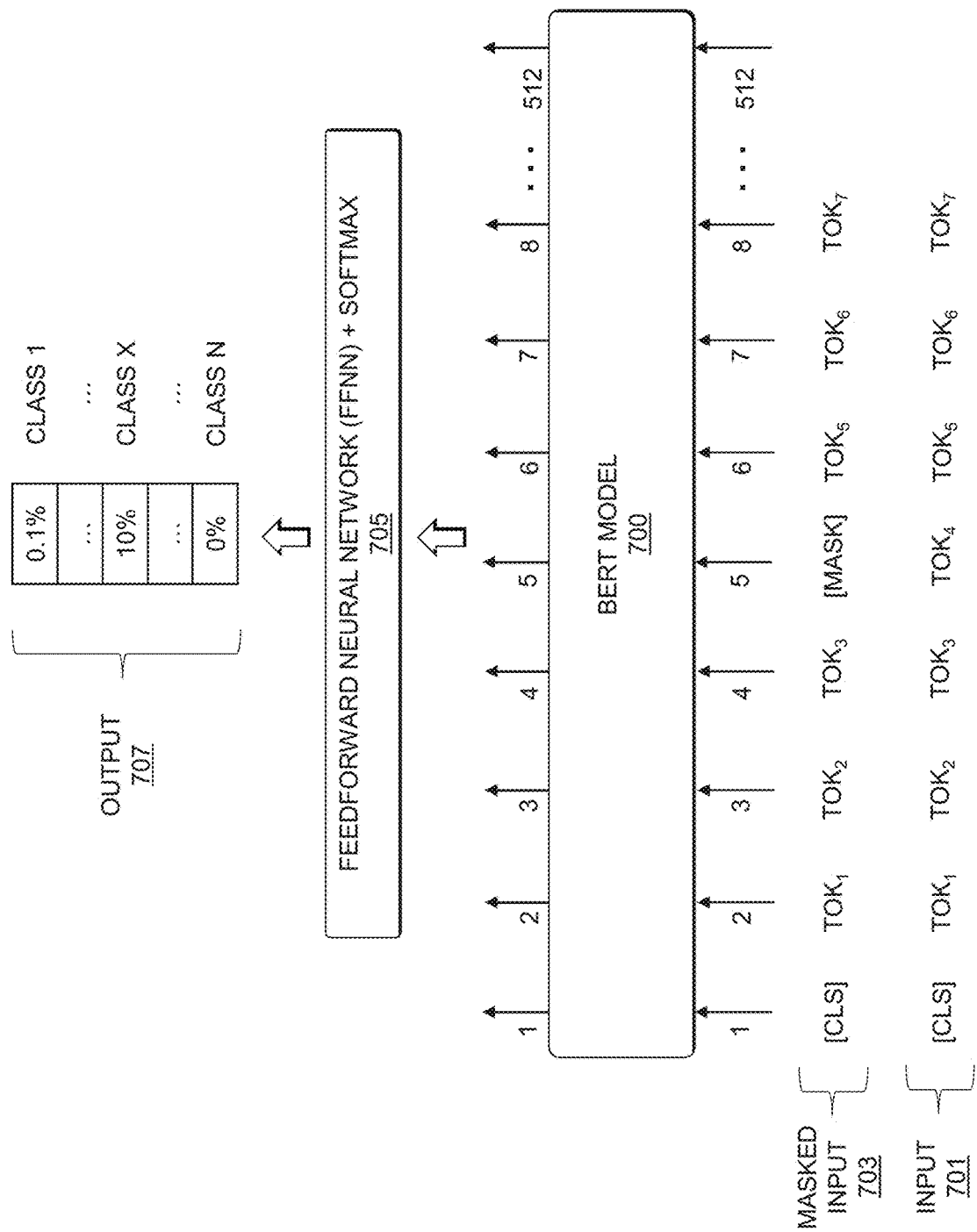
FIG. 7 illustrates use of a masked language model for pre-training a BERT machine learning model in an illustrative embodiment.

To implement the MLM, before feeding word sequences into the BERT model, a designated percentage (e.g., 15%) of the words in each sequence are replaced with a "[MASK]" token. The model then attempts to predict the original value of the masked words, based on the context provided by the other non-masked words in the sequence. The prediction of the output words includes: (1) adding a classification layer on top of the encoder output; (2) multiplying the output vectors by the embedding matrix, transforming them into the vocabulary dimension; and (3) calculating the probability of each word in the vocabulary (e.g., using softmax). FIG. 7 illustrates such processing, where a set of input tokens 701 is masked 703 and then input to BERT model 700. The BERT model 700 feeds to a classification layer, implemented as a feedforward neural network (FFNN) and softmax layer 705. The final output 707 indicates the probability of the masked token (e.g., token 4, $TOK_4$) being each of a set of N possible classes. To give a concrete example, assume that the input 701 is "[CLS] Let's stick to improvisation in this skit" such that "improvisation" is masked. The N classes may be a possible vocabulary (e.g., all English words), with the output 707 indicating a 0.1% chance of the masked word being "aardvak," a 10% chance of the masked word being "improvisation" and a 0% chance of the masked word being "zyzzyva."

Figure 8:
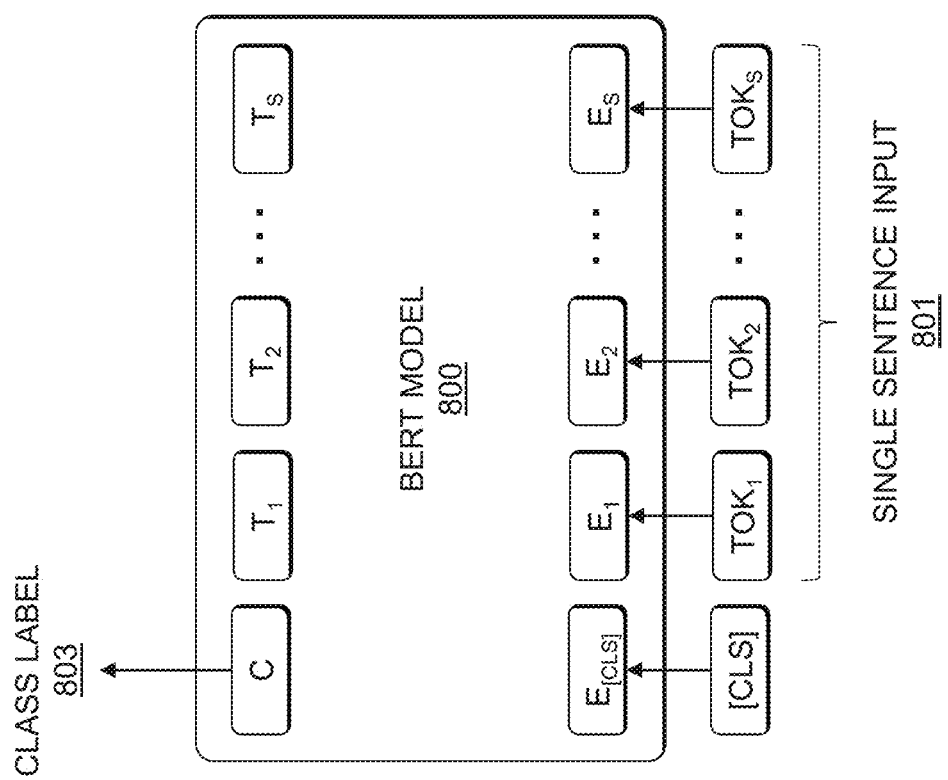
FIG. 8 illustrates next sentence prediction pre-training for a BERT machine learning model in an illustrative embodiment.

NSP will now be described. In the BERT training process, the NSP model receives pairs of sentences as input and learns to predict if the second sentence in the pair is the subsequent sentence in the original document. At the phase of BERT model fine-tuning, using the pre-trained BERT for a specific task is relatively straightforward: text classification tasks such as service request triage may be performed similar to next sentence classification by adding a classification on top of the Transformer output for the [CLS] token, as illustrated in FIG. 8. FIG. 8 shows a BERT model 800, which receives as input a [CLS] token as well as a set of tokens $TOK_1, TOK_2, \ldots TOK_S$ representing a single sentence 801. The BERT model 800 determines embeddings $E_{[CLS]}, E_1, E_2, \ldots E_S$, as well as output $C, T_1, T_2, \ldots T_S$. The output C represents a class label 803 for the input sentence 801, and may be used for fine-tuning the BERT model 800 for multi-class classification.

In some embodiments, machine learning techniques are used to facilitate the processing of log file triage. Such machine learning techniques provide procedures for: preprocessing log segments; building a BERT-based classifier for log segment triage; scoring the risk of log segments; and detecting critical areas of log files that indicate a root cause of system failures based on the risk scores of the log segments.

As noted above, the machine learning techniques herein provide a model (e.g., BLTM) that is able to find critical areas in log files and recommend known issues for log segments in such critical areas. Log lines of log files are translated to log pattern IDs during pre-processing, followed by pre-training a BERT-based language model based on the sequences of log pattern IDs. Fine-tuning is then applied to the language model utilizing labeled log segments to get a BLTM. The entropy of the BLTM's softmax output is used to score the risk of a log segment. In application, input log files are split into continuous log segments, and the BLTM is used to scan such log segments and score the risk of each log segment by the entropy of the BLTM's softmax output. Based on the risk scores of the log segments, a sliding window average filter can detect the critical areas from the complete log file or files. The BLTM then recommends the most likely known issue or issues for each log segment in the critical log file areas.

The accuracy of triage results for log segments may be evaluated using a Top 1 or Top N accuracy measure. In a multi-class text classification problem, Top 1 accuracy extracts the maximum value out of the final softmax outputs This extracted value corresponds to the confidence for the predicted class for the text input. Top N accuracy measures how often the labeled class falls in the top N values of the softmax distribution. Top N accuracy is very useful to explore the application of BLTM. If BLTM can achieve a Top N accuracy above some designated threshold (e.g., greater than or equal to 75%) and N is an acceptable number of known issues for a support engineer to review to triage a log segment, then deployment of BLTM into a monitoring and analytics platform (e.g., a log analysis system) to recommend known issues provides various benefits.

To begin, labeled log segments are split into a training data set and an evaluation data set. Some types of storage systems have a set of rules developed for analyzing known issues of historical log files. For example, Dell EMC XtremIO® storage arrays have an almost complete set of rules for analyzing known issues of historical log files. If a log line "x" is hit by a given one of the set of rules, the log lines ranging from x−256 to x+256 are used to form a log segment. The log segment is labeled by the consequent known issue corresponding to the given rule. In this way, a rule set may be used to generate instances for building and evaluating BLTM. To demonstrate the results, a set of 499 cases were chosen as a training data set and 109 cases were chosen as an evaluation set. The ruleset is run on the historical log files for these cases, and as a result 13,866 log segments in the training set "hit" one of the set of rules and 3,373 log segments in the evaluation set "hit" one of the set of rules. In total, 102 known issues are covered by the ruleset.

Figure 9:
FIG. 9 illustrates translation of raw log lines to log patterns and associated log pattern identifiers in an illustrative embodiment.
Figure 9:

Next, each log line in the log segments is translated to a log pattern ID. Each log segment may then be represented as a sequence of log pattern IDs. The log pattern identification approach described above with respect to FIG. 4 may be applied for identifying the log lines, which are then translated to log pattern IDs by clustering. The similarity between log lines may be measured using various similarity techniques, including but not limited to Jaccard similarity. The log lines within the same cluster are translated to the same log pattern ID. FIG. 9 shows a portion of a log segment that is represented as a sequence of log pattern IDs. More particularly, FIG. 9 illustrates a table 901 showing raw log lines of a log file, as well as a table 903 illustrating log pattern IDs and associated log patterns for the raw log lines after running similarity processing (e.g., using a Jaccard similarity measure). It should be noted that different word sequences may result in different meanings, even if the same words are used (e.g., "Don't stop, go" and "Stop, don't go" use the same words but have opposite meanings). Log templates, however, are typically well coded so that the probability of such occurrences is small. Further, clustering of log lines and fine-tuning thresholds may reduce the log line dimension.

Figure 10:
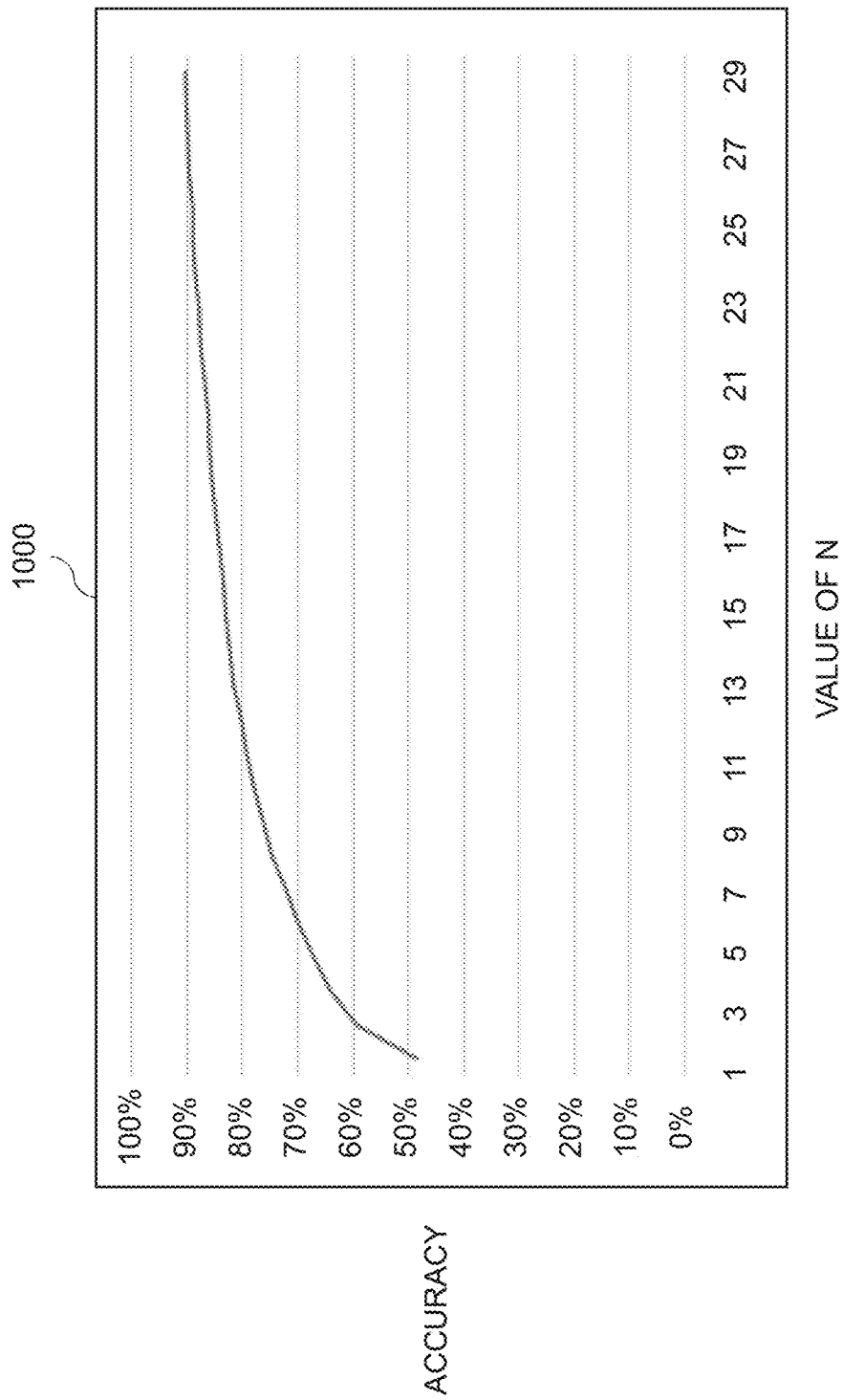
FIG. 10 shows a plot illustrating accuracy of a machine learning model for triaging service requests in an illustrative embodiment.

Once the log pattern IDs are generated for each log line in the log segments, a MLM is built to learn the feature representation for log segments. A supervised classifier is then built based on the feature representation learned by the MLM. Log segments in the training set may be used to present log segments to the MLM. Each log segment can be processed as a document including some designated number (e.g., 512) of log pattern IDs. Various parameters and architectures may be used to build the MLM. Once the MLM is built, a text classifier may be built by fine-tuning the MLM with labeled known issues to get a BLTM. For the evaluation data set, the Top 1 accuracy is 48.41%. The Top N accuracy (e.g., for 1≤N≤30) is shown in the plot 1000 of FIG. 10. The Top 10 accuracy, for example, is 79.34%, which provides acceptable results for practice.

Figure 11:
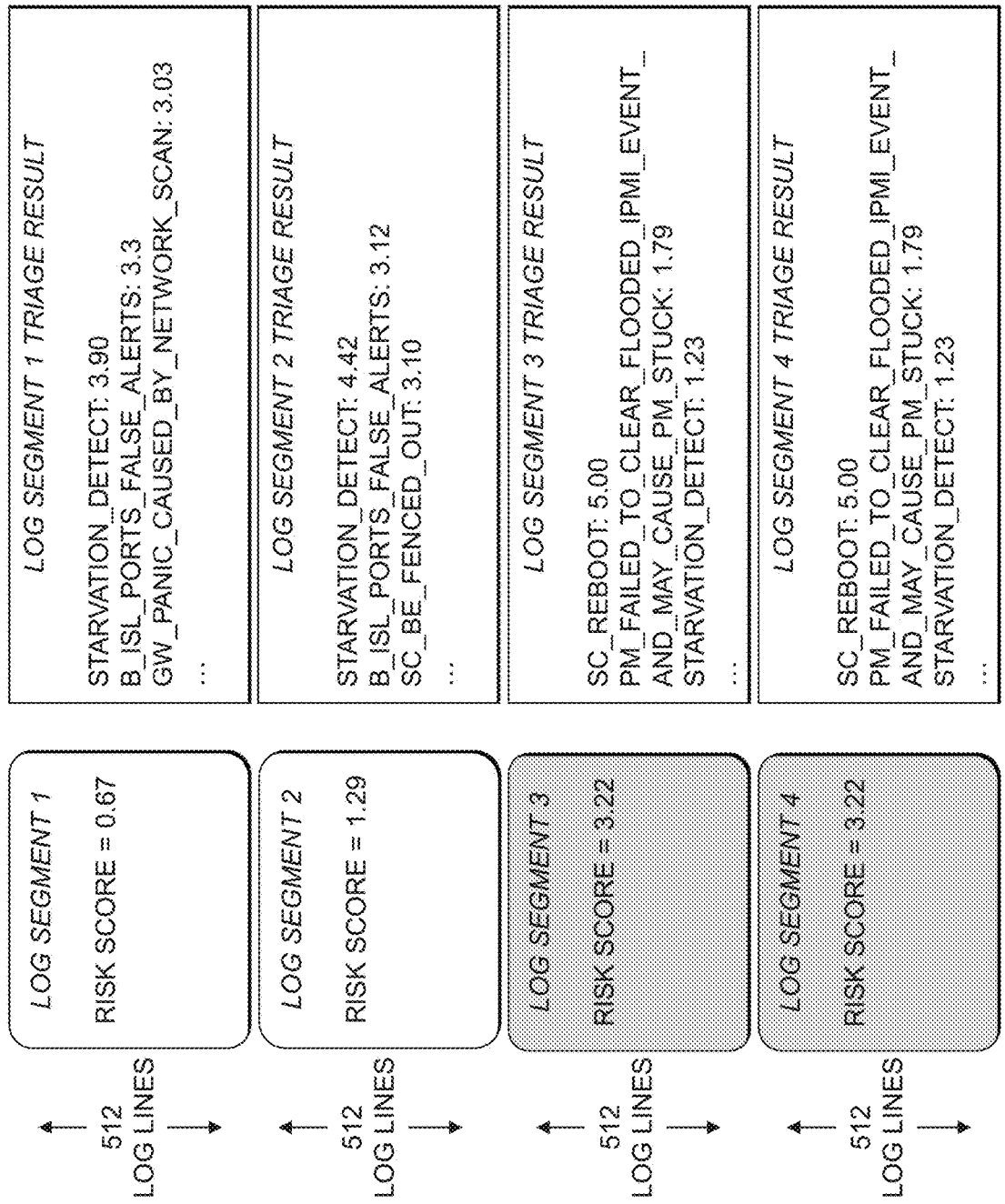
FIG. 11 shows an example of risk score determination for a sequence of log segments in an illustrative embodiment.

The entropy of the BLTM's softmax output is then used to score the risk of a scanned log segment. The process of BLTM finding log segments with high risk will be demonstrated below with reference to FIG. 11, which illustrates application of a BLTM scan to an example log file. In the FIG. 11 example, four log segments of 512 log lines are analyzed, and their associated risk scores are shown. FIG. 11 also shows the triage results for the four log segments. The following equation may be used to calculate the entropy: $-\Sigma_i P_\theta(y_i|x) \log P_\theta(y_i|x)$. At first, the log file is split into continuous log segments (e.g., of 512 log lines). As the BLTM scans through the log segments, the entropy of the probability distribution of known issues (e.g., the softmax output) is calculated to score the risk of the log segment causing system failure as illustrated in FIG. 11. In FIG. 11, the log segments shaded white (e.g., log segments 1 and 2) are considered low risk while the log segments shaded gray (e.g., log segments 3 and 4) are considered high risk. The probability distribution, before normalization, of known issues is also considered.

Figure 12:
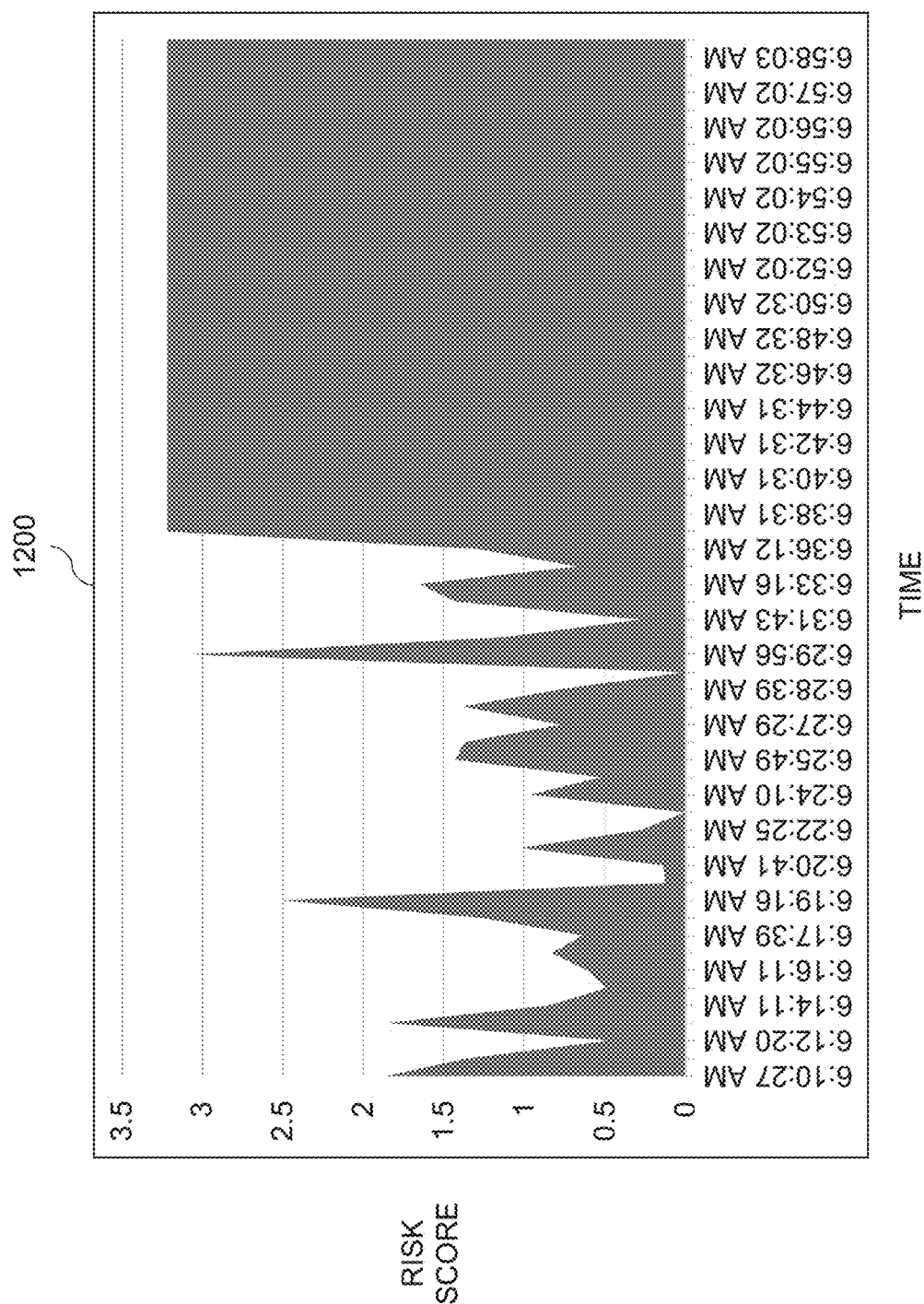
FIG. 12 shows a plot of risk scores over time for a sequence of log segments in an illustrative embodiment.

FIG. 12 shows a plot 1200 illustrating the process of scanning the example log file using BLTM. More particularly, plot 1200 shows risk score plotted versus time, illustrating the change in risk scores for the example log file. In this example, the failure occurred around 6:40 AM. The BLTM detects the risk correctly, and logs are generated more frequently from the time point that the failure occurs.

In some embodiments, a sliding window average filter is used on the risk scores of the log segments to find the critical areas of the log file that indicate the system failure. A window w is set (e.g., with a size of 2 log segments), along with a threshold t. Suppose that a critical log area, ca, starts with an empty set. As the window average filter is slid through the continuous log segments of the log file, if the average risk scores of the log segments in w is above t, then ca is extended by the log segments in w. Otherwise, the current ca is finalized and a new empty ca is started.

To summarize, the goal in some embodiments is to find critical log segments from a log file, and to find the specific issues for such critical log segments. This advantageously improves service request triaging, by helping to locate the logs indicating system failure and find the root causes for the system failure. Pre-processing is applied to cluster log lines and find log patterns, and then each log line is translated to a log pattern ID. A BERT-based log segment triage model, BLTM, is built by using the log pattern IDs as features. Log files are then scanned using the BLTM to calculate the risk score for each log segment using one or more heuristic rules.

Figure 13:
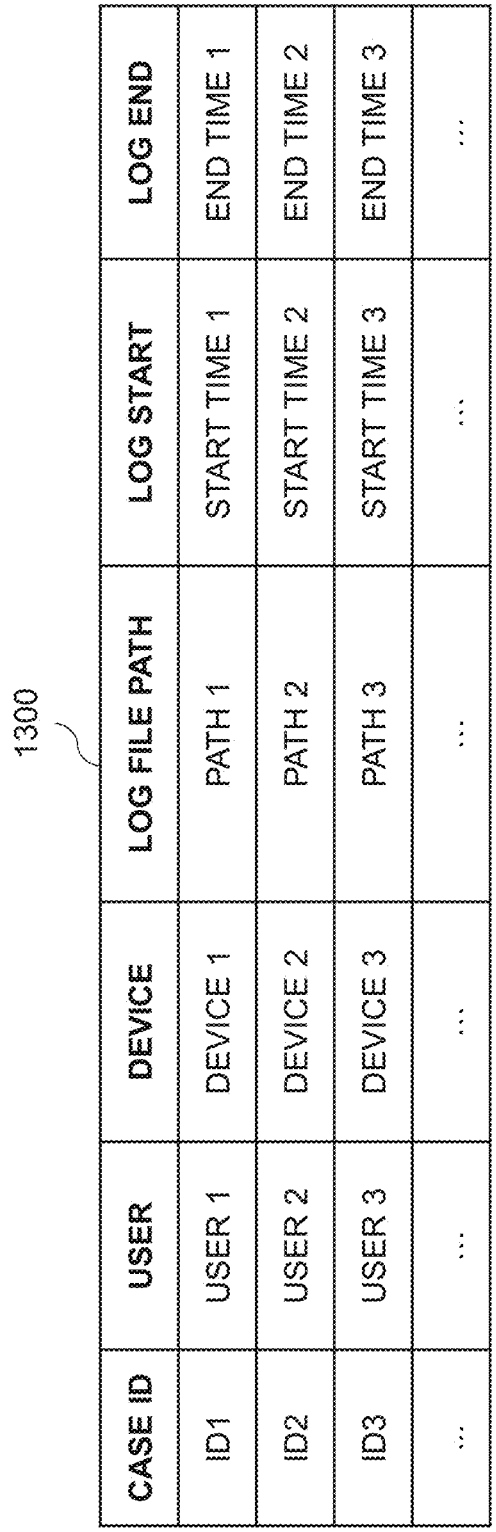
FIG. 13 shows a table of log files that may be selected for application to a machine learning model for triaging service requests in an illustrative embodiment.
Figure 14:
FIG. 14 shows a table of output results of application of a machine learning model for triaging service requests to a given log file in an illustrative embodiment.

FIG. 13 shows an example table 1300 of log files, with the table 1300 including columns for case ID, user, device, log file path, log start time and log end time. In some embodiments, the table 1300 may be presented as part of a graphical user interface, with the table being searchable and entries thereof being selectable for processing using AI scanning (e.g., using a BLTM as described above). FIG. 14 shows a result table 1400 produced after selecting a given one of the logs shown in the table 1300. The result table 1400 includes columns for known issue reference number, issue name, and AI score or correlation confidence, sorted by AI score.

Figure 15A:
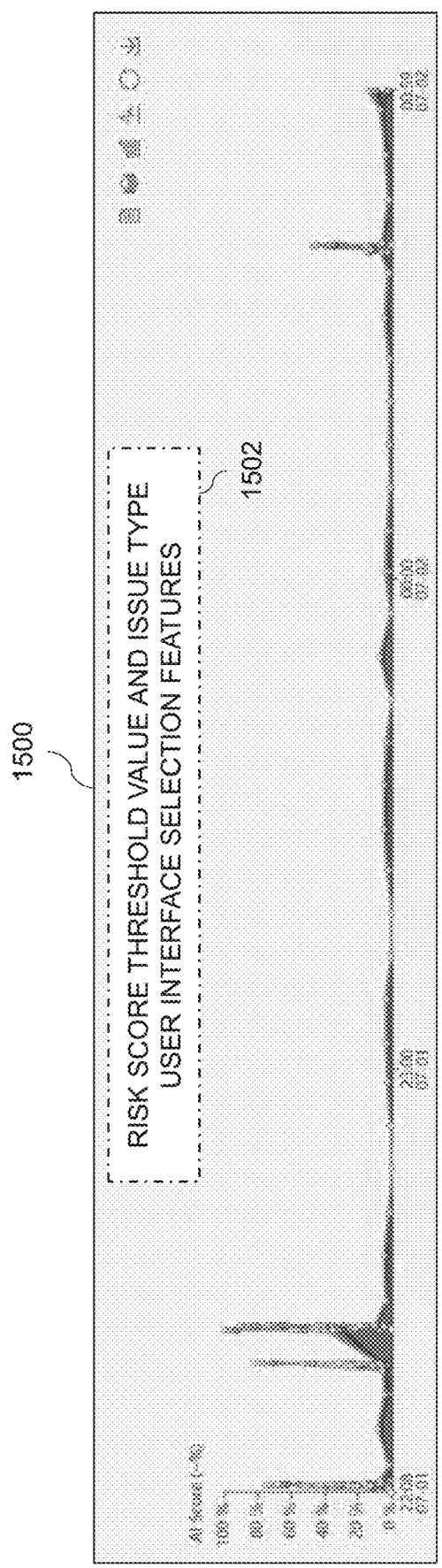
FIGS. 15A-15C show views of an interface for displaying results of application of a machine learning model for triaging service requests to log files in an illustrative embodiment.
Figure 15B:
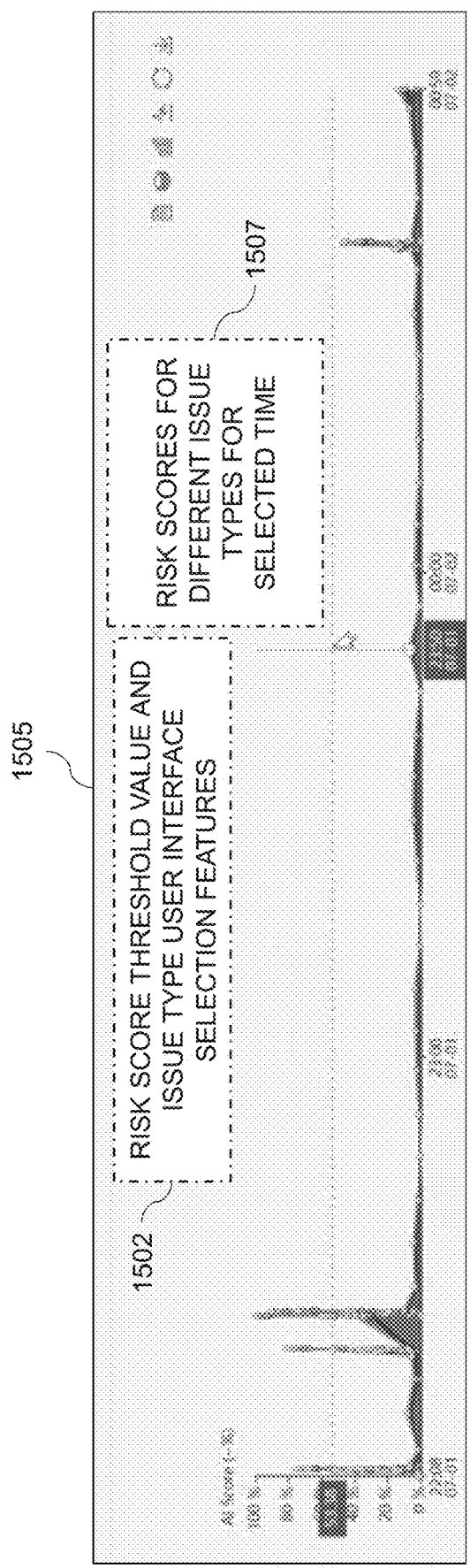
Figure 15C:
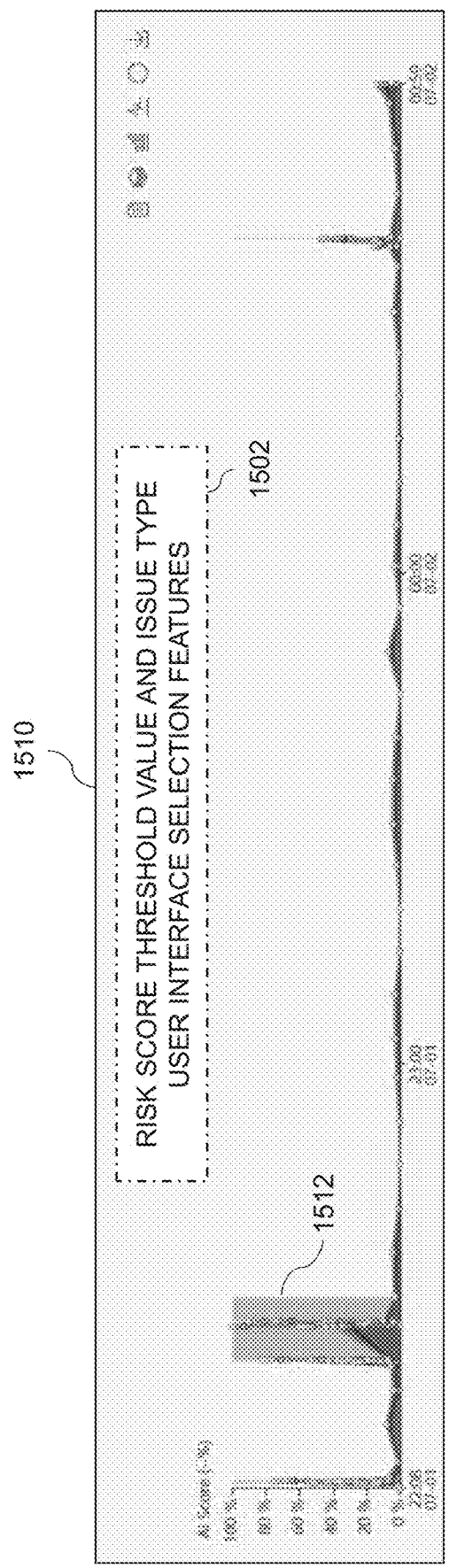

FIGS. 15A-15C show views 1500, 1505 and 1510, respectively, illustrating output of the BLTM in the form of interactive plots of the AI score (percentage) versus time. As shown in FIG. 15A, the view 1500 shows a base view of the plot of AI score versus time. In FIG. 15A, an area of the view 1500 is shown in dashed outline 1502 which includes user-selectable interface features that allow a user to select different issues to highlight in the plot below, as well as to use different thresholds for displaying issues. As shown in FIG. 15B, the view 1505 illustrates how a user may move a mouse along the plot to highlight detailed information in a pop-up box 1507 for a specific time. The detailed information in the pop-up box 1507 may include risk scores calculated for different issues at the specific time. As shown in FIG. 15C, the view 1510 illustrates how a user may choose a threshold (from among the user-selectable interface features in the dashed outline shown in view 1500 of FIG. 15A), and the plot is updated to show a shadowed area 1512 representing the critical area of the log file. If the mouse is moved over the shadowed area 1512, detailed information may be displayed (e.g., in a pop-up box similar to 1507 in the view 1505) that shows the score distribution of the known issues for this critical area log segment.

Illustrative embodiments provide a number of advantages relative to conventional approaches through the use of a log segment triage model, referred to as BLTM, that is built using a state-of-the-art language model (e.g., BERT) with various pre-processing on log files to determine the "DNA" or log pattern IDs for log lines or other portions of log segments of log files. The entropy of the BLTM's softmax output is used to score the risk of log segments, and a sliding window average filter is used to detect critical areas from the log files.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for service request remediation with machine learning based identification of critical areas of log files will now be described in greater detail with reference to FIGS. 16 and 17. Although described in the context of system 100, these platforms may also be used to implement at least portions of other information processing systems in other embodiments.

Figure 16:
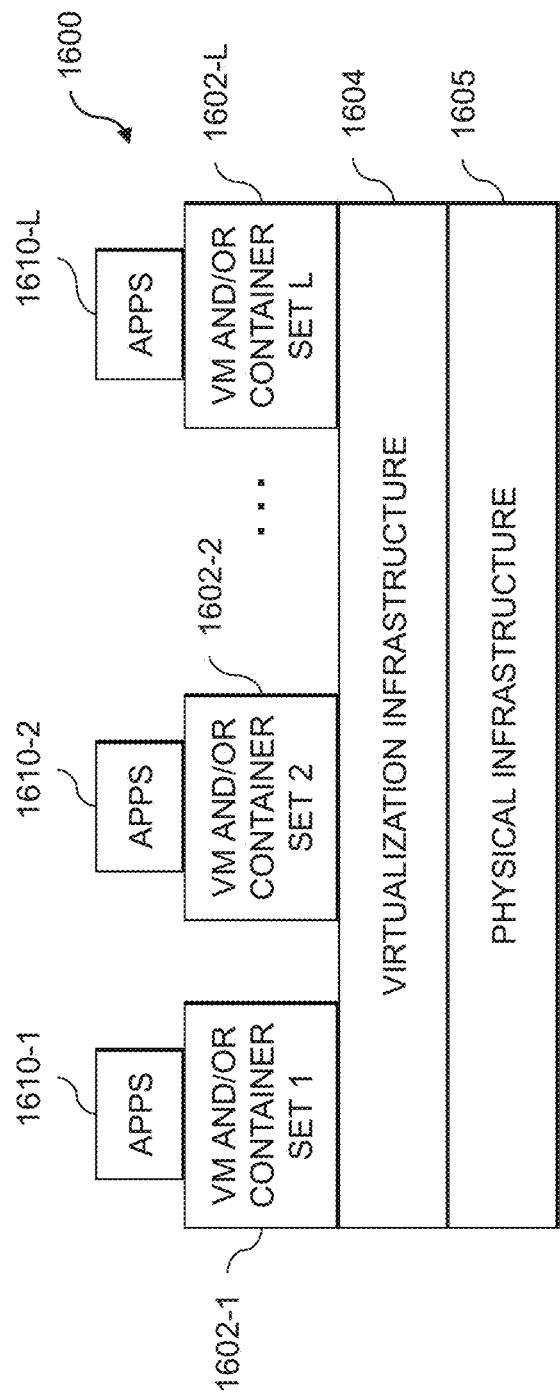
FIGS. 16 and 17 show examples of processing platforms that may be utilized to implement at least a portion of an information processing system in illustrative embodiments.
Figure 17:
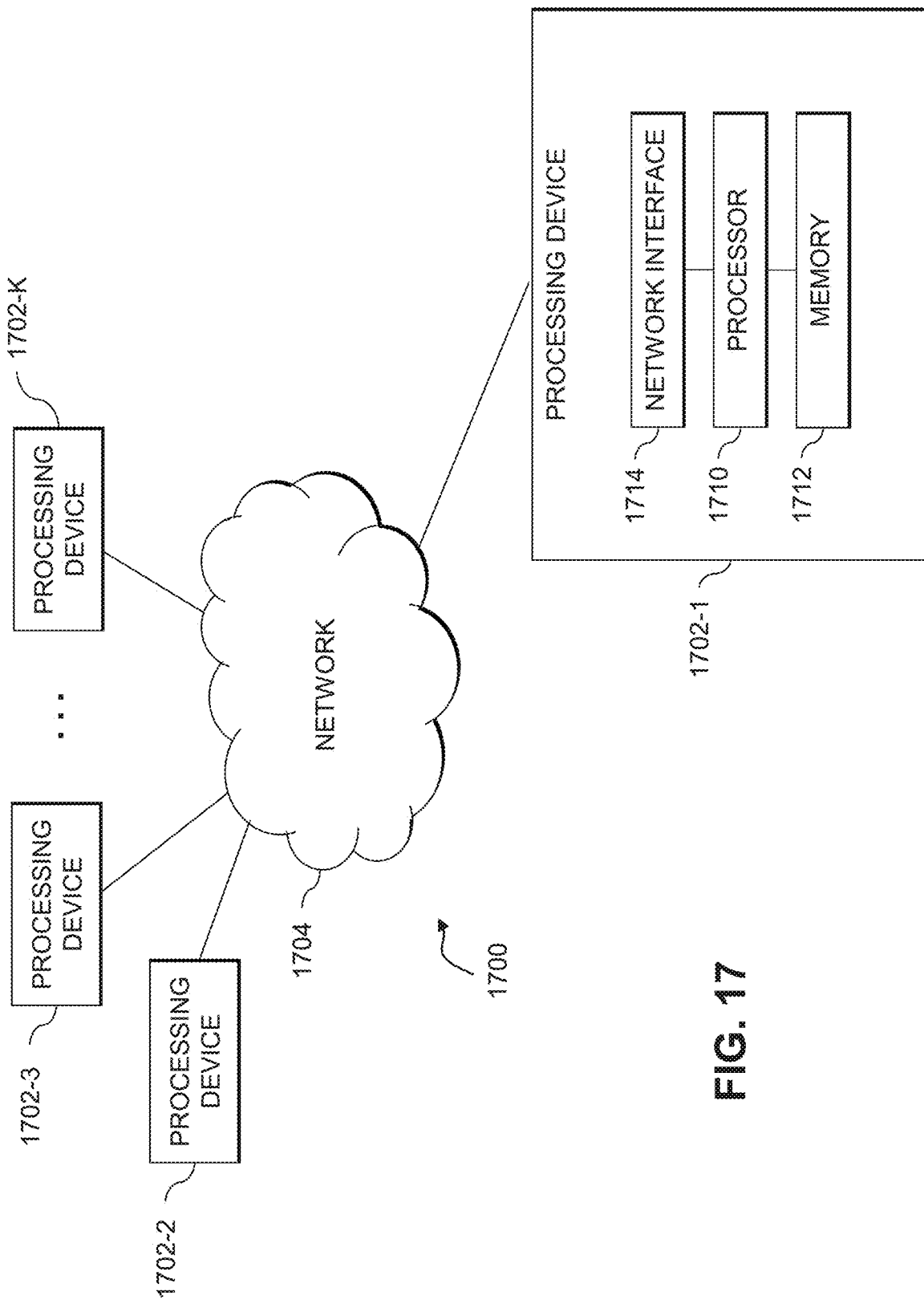

FIG. 16 shows an example processing platform comprising cloud infrastructure 1600. The cloud infrastructure 1600 comprises a combination of physical and virtual processing resources that may be utilized to implement at least a portion of the information processing system 100 in FIG. 1. The cloud infrastructure 1600 comprises multiple virtual machines (VMs) and/or container sets 1602-1, 1602-2, . . . 1602-L implemented using virtualization infrastructure 1604. The virtualization infrastructure 1604 runs on physical infrastructure 1605, and illustratively comprises one or more hypervisors and/or operating system level virtualization infrastructure. The operating system level virtualization infrastructure illustratively comprises kernel control groups of a Linux operating system or other type of operating system.

The cloud infrastructure 1600 further comprises sets of applications 1610-1, 1610-2, . . . 1610-L running on respective ones of the VMs/container sets 1602-1, 1602-2, . . . 1602-L under the control of the virtualization infrastructure 1604. The VMs/container sets 1602 may comprise respective VMs, respective sets of one or more containers, or respective sets of one or more containers running in VMs.

In some implementations of the FIG. 16 embodiment, the VMs/container sets 1602 comprise respective VMs implemented using virtualization infrastructure 1604 that comprises at least one hypervisor. A hypervisor platform may be used to implement a hypervisor within the virtualization infrastructure 1604, where the hypervisor platform has an associated virtual infrastructure management system. The underlying physical machines may comprise one or more distributed processing platforms that include one or more storage systems.

In other implementations of the FIG. 16 embodiment, the VMs/container sets 1602 comprise respective containers implemented using virtualization infrastructure 1604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1600 shown in FIG. 16 may represent at least a portion of one processing platform. Another example of such a processing platform is processing platform 1700 shown in FIG. 17.

The processing platform 1700 in this embodiment comprises a portion of system 100 and includes a plurality of processing devices, denoted 1702-1, 1702-2, 1702-3, . . . 1702-K, which communicate with one another over a network 1704.

The network 1704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1702-1 in the processing platform 1700 comprises a processor 1710 coupled to a memory 1712.

The processor 1710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1712 may comprise random access memory (RAM), read-only memory (ROM), flash memory or other types of memory, in any combination. The memory 1712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1702-1 is network interface circuitry 1714, which is used to interface the processing device with the network 1704 and other system components, and may comprise conventional transceivers.

The other processing devices 1702 of the processing platform 1700 are assumed to be configured in a manner similar to that shown for processing device 1702-1 in the figure.

Again, the particular processing platform 1700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for service request remediation with machine learning based identification of critical areas of log files as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, machine learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
receiving a service request associated with a given asset of an information technology infrastructure;
obtaining at least one log file associated with the given asset;

splitting the at least one log file into a plurality of log segments;

generating a set of log pattern identifiers for each of the plurality of log segments;

determining risk scores for each of the plurality of log segments utilizing a machine learning model, the machine learning model taking as input the set of log pattern identifiers for respective ones of the plurality of log segments and providing as output information characterizing risk of respective ones of the plurality of log segments;

identifying one or more critical areas of the at least one log file based at least in part on the determined risk scores, a given one of the one or more critical areas comprising a sequence of two or more of the plurality of log segments of the at least one log file having determined risk scores above a designated risk score threshold; and analyzing the identified one or more critical areas to determine one or more remedial actions to be applied to the given asset for resolving the service request.

2. The apparatus of claim 1 wherein the given asset comprises at least one of a physical computing resource and a virtual computing resource in the information technology infrastructure.

3. The apparatus of claim 1 wherein splitting the at least one log file into the plurality of log segments comprises splitting the at least one log file into log segments each comprising a designated number of log lines of the at least one log file, and wherein each of the log pattern identifiers represents one of the log lines.

4. The apparatus of claim 3 wherein generating the set of log pattern identifiers comprises clustering the log lines to formulate a set of log patterns, and assigning each of the log lines an identifier associated with one of the set of log patterns.

5. The apparatus of claim 4 wherein clustering the log lines to formulate the set of log patterns comprises measuring similarity between the log lines utilizing one or more similarity measures.

6. The apparatus of claim 1 wherein determining risk scores for each of the plurality of log segments is based at least in part on analyzing an entropy of the output information characterizing the risk of respective ones of the plurality of log segments.

7. The apparatus of claim 6 wherein the machine learning model comprises a Bidirectional Encoder Representations from Transformers (BERT) model.

8. The apparatus of claim 7 wherein the BERT model is pre-trained utilizing a Masked Language Model (MLM).

9. The apparatus of claim 7 wherein the BERT model is pre-trained utilizing Next Sentence Prediction (NSP).

10. The apparatus of claim 7 wherein the BERT model is configured, for a given one of the plurality of log segments:
to embed the set of log pattern identifiers for the given log segment into a set of input vectors;
to process the set of input vectors in a set of two or more stacked encoders; and
to output a sequence of output vectors each corresponding to one of the set of log pattern identifiers for the given log segment.

11. The apparatus of claim 1 wherein identifying the given critical area of the at least one log file comprises applying a sliding window filter to risk scores associated with a continuous sequence of the plurality of log segments of the at least one log file.

12. The apparatus of claim 11 wherein applying the sliding window filter comprises:
setting a window size comprising at least two log segments;
setting one or more threshold matching criteria;
identifying a beginning of the given critical area of the at least one log file when the at least two log segments in a window of the sliding window filter meet the one or more threshold matching criteria; and
identifying an end of the given critical area of the at least one log file when the at least two log segments in the window of the sliding window filter do not meet the one or more threshold matching criteria.

13. The apparatus of claim 12 wherein the sliding window filter comprises a sliding window average filter, and wherein the one or more threshold matching criteria comprises a designated average risk score of the at least two log segments in the window of the sliding window average filter.

14. The apparatus of claim 1 wherein analyzing the identified one or more critical areas comprises:
identifying one or more issues from a knowledge base of issues that have at least a designated threshold likelihood of affecting the given asset in the information technology infrastructure; and
determining the one or more remedial actions to be applied to the given asset for resolving the service request based at least in part on the identified one or more issues from the knowledge base of issues.

15. A computer program product comprising a non-transitory processor-readable storage medium having stored therein program code of one or more software programs, wherein the program code when executed by at least one processing device causes the at least one processing device to perform steps of:
receiving a service request associated with a given asset of an information technology infrastructure;
obtaining at least one log file associated with the given asset;
splitting the at least one log file into a plurality of log segments;
generating a set of log pattern identifiers for each of the plurality of log segments;
determining risk scores for each of the plurality of log segments utilizing a machine learning model, the machine learning model taking as input the set of log pattern identifiers for respective ones of the plurality of log segments and providing as output information characterizing risk of respective ones of the plurality of log segments;
identifying one or more critical areas of the at least one log file based at least in part on the determined risk scores, a given one of the one or more critical areas comprising a sequence of two or more of the plurality of log segments of the at least one log file having determined risk scores above a designated risk score threshold; and
analyzing the identified one or more critical areas to determine one or more remedial actions to be applied to the given asset for resolving the service request.

16. The computer program product of claim 15 wherein identifying the given critical area of the at least one log file comprises applying a sliding window filter to risk scores associated with a continuous sequence of the plurality of log segments of the at least one log file.

17. The computer program product of claim 16 wherein applying the sliding window filter comprises:

setting a window size comprising at least two log segments;

setting one or more threshold matching criteria;

identifying a beginning of the given critical area of the at least one log file when the at least two log segments in a window of the sliding window filter meet the one or more threshold matching criteria; and identifying an end of the given critical area of the at least one log file when the at least two log segments in the window of the sliding window filter do not meet the one or more threshold matching criteria.

18. A method comprising:

receiving a service request associated with a given asset of an information technology infrastructure;

obtaining at least one log file associated with the given asset;

splitting the at least one log file into a plurality of log segments;

generating a set of log pattern identifiers for each of the plurality of log segments;

determining risk scores for each of the plurality of log segments utilizing a machine learning model, the machine learning model taking as input the set of log pattern identifiers for respective ones of the plurality of log segments and providing as output information characterizing risk of respective ones of the plurality of log segments;

identifying one or more critical areas of the at least one log file based at least in part on the determined risk scores, a given one of the one or more critical areas comprising a sequence of two or more of the plurality of log segments of the at least one log file having determined risk scores above a designated risk score threshold; and analyzing the identified one or more critical areas to determine one or more remedial actions to be applied to the given asset for resolving the service request;

wherein the method is performed by at least one processing device comprising a processor coupled to a memory.

19. The method of claim 18 wherein identifying the given critical area of the at least one log file comprises applying a sliding window filter to risk scores associated with a continuous sequence of the plurality of log segments of the at least one log file.

20. The method of claim 19 wherein applying the sliding window filter comprises:

setting a window size comprising at least two log segments;

setting one or more threshold matching criteria;

identifying a beginning of the given critical area of the at least one log file when the at least two log segments in a window of the sliding window filter meet the one or more threshold matching criteria; and identifying an end of the given critical area of the at least one log file when the at least two log segments in the window of the sliding window filter do not meet the one or more threshold matching criteria.

* * * * *